(12) United States Patent
Mendes

(10) Patent No.: US 7,901,484 B2
(45) Date of Patent: Mar. 8, 2011

(54) RESIN-IN-LEACH PROCESS TO RECOVER NICKEL AND/OR COBALT IN ORE LEACHING PULPS

(75) Inventor: Flavia Dutra Mendes, Belo Horizonte-Minas Gerais (BR)

(73) Assignee: Vale Inco Limited, Toronto (CA)

( * ) Notice: Subject to any disclaimer, the term of this patent is extended or adjusted under 35 U.S.C. 154(b) by 107 days.

(21) Appl. No.: 12/183,231

(22) Filed: Jul. 31, 2008

(65) Prior Publication Data

US 2009/0056500 A1 Mar. 5, 2009

Related U.S. Application Data

(60) Provisional application No. 60/968,423, filed on Aug. 28, 2007.

(51) Int. Cl.
C22B 3/04 (2006.01)
C22B 3/24 (2006.01)

(52) U.S. Cl. .................. 75/743; 205/587; 205/594; 423/139

(58) Field of Classification Search .............. 75/743; 205/589, 594, 587; 423/139
See application file for complete search history.

(56) References Cited

U.S. PATENT DOCUMENTS

| | | | | |
|---|---|---|---|---|
| 3,998,924 A | | 12/1976 | Jones et al. ................ 423/7 |
| 5,785,736 A | * | 7/1998 | Thomas et al. ............... 75/736 |
| 6,350,420 B1 | * | 2/2002 | Duyvesteyn et al. ........ 423/139 |
| 7,597,738 B2 | * | 10/2009 | Liu et al. ..................... 75/416 |
| 2005/0226797 A1 | | 10/2005 | Liu et al. ................. 423/140.1 |
| 2008/0271571 A1 | * | 11/2008 | Liu et al. ..................... 75/743 |

FOREIGN PATENT DOCUMENTS

| | | |
|---|---|---|
| GB | 2291870 | 7/1996 |
| WO | WO 01292076 | 4/2001 |
| WO | WO 2006000098 | 1/2006 |
| WO | WO 2007087698 | 9/2007 |

OTHER PUBLICATIONS

Johns M. W. et al.: "A resin-in-leach process for the extraction of manganese from an oxide" (1985) Proceedings of MINTEK 50: Int'l conference on Mineral Science and Technology, Published by Council for Mineral Technology, Randburg, South Africa, 637-645.

(Continued)

Primary Examiner — George Wyszomierski
Assistant Examiner — Tima M McGuthry-Banks
(74) Attorney, Agent, or Firm — Arent Fox, LLP

(57) ABSTRACT

A hydrometallurgical resin-in-leach (RIL) process for directly recovering nickel and/or cobalt. Simultaneous pulp leaching by adding an acid or base, dissolves the metals of interest with adsorption of the metals rendered soluble in on ionic exchange resin. Following elution of the changed resin, purification of nickel and cobalt present in the eluate can be recovered by conventional methods, such as precipitation, extraction by solvents and membranes. The regenerated resin is recirculated for further use.

17 Claims, 1 Drawing Sheet

OTHER PUBLICATIONS

Mendes F.D. et al.: "Selective sorption of nickel and cobalt from sulphate solutions using chelating resins" (2004) *Int. J. Miner. Process.*, 74 (1-4), 359-371.

Mendes F.D. et al.: "Recovery of nickel and cobalt from acid leach pulp by ion exchange using chelating resin" (2005) *Minerals Engineering*, 18(9), 945-954.

"The Use of Ion-Exchange Resins for the Recovery of Valuable Species from Slurries of Sparingly Soluble Solids"—Minerals Engineering, vol. 10, Issue 9, Sep. 1997, pp. 929-945. P. G. R. DeVilliers, J. S. J. Von Deventerb and L. Lorenzenb.

"Modification and Preparation of Polymeric Adsorbents for Precious-Metal Extraction in Hydrometallurgical Processes"—Reactive and Functional Polymers, vol. 36, Issue 2, Mar. 1998, pp. 149-165, J. L. Cortino, E. Meinhardt. O. Roijals and V. Marti.

"Chlorine Leaching of Gold-bearing Sulphide Concentrate and Its Calcine—Hydrametallurgy." vol. 29, Issues 1-3, Jun. 1992, pp. 205-215, Li Xming, Ke Jiajun, Meng Xinhui and Li Bin.

"Treatment of Carbonaceous Refractory Gold Ores"—Minerals Engineering, vol. 4, Issues 7-11, 1991, pp. 1043-1055. P. M. Afenya.

\* cited by examiner

RESIN-IN-LEACH PROCESS TO RECOVER NICKEL AND/OR COBALT IN ORE LEACHING PULPS

RELATED APPLICATION

This application claims priority from U.S. provisional application Ser. No. 60/968,423 which was filed on Aug. 28, 2007.

TECHNICAL FIELD

The present invention relates to processes for recovering nickel and/or cobalt from ores. More specifically, the process of the invention provides simultaneous pulp leaching by adding an acid or base, in order to dissolve the metals of interest, with adsorption of metals rendered soluble in an ionic exchange resin through a resin-in-leach process. Following elution, purification of nickel and cobalt present in the eluate can be recovered by conventional methods, such as precipitation, extraction by solvents and membranes. The regenerated resin goes back to the circuit, for further use.

BACKGROUND OF THE RELATED ART

Historically, innovations in lateritic-based nickel production are chiefly the outcome of technologies initially used in uranium processing, and later applied to the gold and copper industries. A good case in point is extraction by solvent (SX) and ionic exchange resins (IX). Using pyrometallurgy and hydrometallurgy, four processes are currently assessed and used in the nickel industry. Current process technologies basically differ in their initial stage.

In lateritic ore processing, there are many options available. However, selecting the best process for a plant initially depends on the ore available. Chemical or thermal treatment is used in lateritic nickel deposits processing. Plants using reduction furnaces or acid leaching have faced many challenges in engineering, construction, start-up, and operational development. A wide-ranging variety of flowcharts can be used for profiting nickel lateritic ores involving pyrometallurgical and hydrometallurgical processes. Chemical composition of lateritic ores varies widely from deposit to deposit, and this variation certainly defines the best process route to be used.

Pyrometallurgical Process—Fusion In pyrometallurgical processes, special mention goes to fusion (melting) for FeNi production, adequate for ores mostly containing saprolite (garnierite supergenic enrichment). These ores contain proportionately low levels of cobalt and iron, compared to limonitic ores. The Ni/Co and Ni/Cu ratios to feed the FeNi process must be above 40 and 80, respectively. The pyro fusion process can yield FeNi or matte. Ore preparation stage comprises drying, calcination and, at times, reduction in rotary furnace or casting in electric furnace in the presence of reducing sources. If matte is the product to be produced, then elementary sulfur is added to the furnace. Pyrometallurgical processes are intensive energy consumers and, thus, all humidity and water combined must be removed from the process. Fusion of the mix can reach temperatures in the 1400° to 1600° C. range. Electric power and fuel as reducing agents are the two costliest items in the process. Fusion temperature is mainly a function of the $SiO_2$/MgO ratio and the FeO grade. In an electric furnace, the temperature difference of metal or matte and slag can vary between 100° and 200° C. This process demands that the $SiO_2$/MgO ratio be between 1.8 and 2.0.

In addition to the fusion (melting) pyrometallurgical process, Caron (reduction process/ammonia leaching) and HPAL (high pressure acid leaching) are currently the two hydrometallurgical processes to recover nickel and cobalt in laterites. These technologies require a relative aggressive chemical treatment and high capital investment, in addition to a strong dependency on the cost of fuel and sulfuric acid/sulfur, respectively.

Caron Process—Caron is a process normally used in lateritic ores comprising a mix of limonite and saprolite. The ore is dried and the nickel is selectively reduced (with cobalt and partly iron) to metal at temperatures around 700° C. Subsequently, basic metals are selectively extracted via leaching through an ammonia solution. This Caron process is industrially used in four plants: Nicaro and Punta-Gorda in Cuba, Niquel Tocantins in Brazil and Yabulu in Australia. This process has several downsides: ore preparation involves drying, calcination and reduction, which are heavy consumers of energy. The leaching stage uses ammonia, whose odor is highly unpleasant. Nickel recovery rate falls short of the fusion (melting) and HPAL processes.

HPAL Process—The ore fraction used in the HPAL process is predominantly limonitic. A small portion of saprolitic ore can also be mixed, provided that Mg and Al grades do not excessively raise sulfuric acid consumption. This reagent is roughly 30% of nickel operating cost. Leaching is carried out in autoclaves at temperatures in the 145 to 270° C. range. Products from an HPAL plant can be: electrolytic nickel, nickel oxide, or nickel briquettes. Some industrial plants produce intermediate products, such as mixed sulfide or a hydroxide mix of nickel and cobalt.

Acid leaching is a process mostly developed in Australia. As the sulfur price declined, an opportunity arose to reconsider further use of lateritic ores with other features, which were not used in traditional production processes. Furthermore, nickel was recovered with greater purity, efficiency and reduction of operating costs. Other incipient modalities of acid leaching under atmospheric conditions are part of new technologies to extract nickel and cobalt from ores, such as sulfuric or chloride leaching.

Flexibility, low capital cost, high metal recovery, low operating cost, and energy generation all translate into a logistics which could indicate the atmospheric leaching technology as the process of choice in medium-term and long-term development of lateritic deposits. Many analysts believe that operating costs can be reduced, as can investments (cost of capital/year).

Several atmospheric leaching hydrometallurgical routes are being developed to extract nickel and cobalt from lateritic ores such as those described in US 2005/0226797 A1 "Atmospheric Pressure Leach Process for Lateritic Nickel Ore" to H. Liu, et al. and WO 06/000098 "Method for Nickel and Cobalt Recovery from Laterite Ores by Reaction with Concentrated Acid and Water Leaching" to D. Neudorf. The objective in these routes is to render metals soluble, using inorganic acids, followed by solid-liquid separation and neutralization, prior to final metal recovery. Selective recovery of the metal present in the leaching pulp is a major item in economic evaluation. Presence of many impurities (such as copper, iron, magnesium and others) may well be the top technological hurdle to be overcome. One option may be the use of physical-chemical methods, such as using ionic exchange materials and extraction via solvents. In the specific case of nickel and cobalt, which is the purpose of the present invention, it worth noting that they have very similar chemical properties. This facilitates their mutual recovery, whether through precipitation as sulfides or extraction via solvents in a chloride, ammonia or sulfur medium. As for ionic exchange, further detailed in the present invention, studies are being intensified and various approaches have yielded rather promising results.

Atmospheric sulfuric leaching can be used in some types of lateritic ores with low iron grade, leading to significant reduction in investments. This involves vat leaching at temperatures below boiling point. Normally, some reducing agent is added, to control Eh in the 800-900 mV range. Results are promising, with slight decrease in nickel ore, if compared to the HPAL process, even though there is greater sulfuric acid consumption.

Characteristics of Sulfuric Atmospheric Leaching
  Applicable to lateritic ores—limonitic and saprolitic fractions undergo atmospheric pressure treatment
  Simplicity in operation, process control and maintenance
  No exotic construction materials (Ti) are used
  High availability with no unplanned depressurizing
  Highly attractive in terms of investment and operating cost
  No industrial application Chloride atmospheric leaching occurs under atmospheric pressure and temperatures below the boiling point, with HCl recovery as shown in the processes below. This process is being considered by Jaguar Nickel for the Ceceou deposit in Guatemala. Major upsides are lower investment cost vis-à-vis the HPAL process and recycling the HCl leaching agent through pyrohydrolysis regeneration. Its downside is the use of special materials resistant to high temperatures in a chloride acid environment.

Characteristics of Chloride Atmospheric Leaching
  Treating ores with grades up to 25% of Mg
  High Ni and Co extraction rates (95%)
  HCl production via $H_2SO_4$ (which is five times less expensive, with high reaction power)
  A simple process
  No difficult wastes are generated for later disposal
  Potential income from byproducts, such as Mg and Fe as chloride, but mainly as Glauber salt ($Na_2SO_4.10H_2O$)
  Possible treatment of ore's more acid fraction (Magnetic—High Fe-Low Mg) and its less acid fraction (Non-magnetic—Low Fe-High Mg) in two different flows less acid consumption, shorter residence time.
  No use of exotic materials such as Ti in the equipments. Coal is used as chlorination energy source.
  Several upsides (lower operating cost, lower capital cost, possible acid regeneration, engineering modernization, downstream inclusion with greater simplicity and savings, searching for metal with adequate London Metal Exchange [LME] grade) make these new technologies ever more feasible and attractive in nickel ore processing. Flexibility, low capital cost, high metal recovery, low operating cost, and energy generation all translate into a logistics which can indicate the atmospheric leaching technology as the process of choice in medium-run and long-run development of lateritic deposits.

All acid leaching plants include a multi-stage circuit for settlement in countercurrent, for solid-liquid separation. This demands considerable capital & operating costs, uses large areas and requires significant amounts of washing water. An alternative to recover nickel and cobalt from the leaching pulp without using thickeners is to use a resin-in-leach (RIL) system, which is the objective of the present invention. The last decade has seen plenty of ionic exchange resin in hydrometallurgical processes, driven mainly by the activated coal technology in gold mining. Moreover, ionic exchange resins are commercially available for nearly any separation process. Its use can ensure more effective and simple purification, if compared to purification by precipitation or extraction through solvent—the two most commonly used method for this purpose. An adsorption or ionic exchange process is more adequate and satisfactory to recover or remove low concentration of some metal ions in the presence of an excess of other metals. Furthermore, ionic exchange needs no costly filtration, no low selectivity of nickel or other metals, there is no reagent loss—all of which are disadvantages inherent to extraction-by-solvent processes.

The acid leaching process generates an acid pulp containing dissolved metals, including high concentrations of iron, aluminum, manganese and magnesium, in addition to nickel, cobalt and copper. Some upsides influence the decision to use the ionic exchange resin technology in hydrometallurgical extraction processes. These considerations are: (1) lesser environmental impact—less water consumption and opportunity for water recycling; (2) lower operating & capital cost; and (3) higher quality of metal products—high selectivity for metals of interest and high separation capacity. The RIL technology can be used to replace conventional counter current decantation (CCD) technology, in order to reduce cost and environmental impact Every nickel lateritic ore leaching process includes a multi-stage settlement circuit in CCD, followed by precipitation and/or liquid-solid extraction for metal recovery. When a low grade nickel lateritic ore is hydrometallurgically treated and liquid-solid separation becomes necessary, the operating cost is significant, process inefficiency causes nickel loss, due to the difficulty in washing solids and in recovering the dissolved species. A solution to this constrain is to recover the dissolved metal in the pulp itself, during leaching, using an ionic exchanger and rendering the liquid-solid separation unnecessary. An alternative to recover nickel and cobalt while the pulp is being leached would be to use the resin-in-leach system, which is the purpose of the present invention. This technology—industrially proven in gold and uranium recovery—can be used in processes which contemplate replacing conventional CCD technology. Using the ionic exchange technique with polymeric resins should offer some advantages, such as (1) no reagent losses due to dragging, as is the case in other extraction-by-solvents processes, and (2) efficient recovery and removal of minor concentrations of some metal ions or an excess of other metals. The ionic exchange resin technique tends to lower operating & capital costs, to ensure greater sustainability without using organic products, such as in extraction through solvents.

A RIL process can be used, through resin adsorption, in recovering metals dissolved during leaching, but prior to pulp solid-liquid separation, thus avoiding product loss. Ionic-exchange polymeric resins have been increasingly used in the last decade, and have been commercially available for nearly all separation processes. The process is free from reagent loss and the resins promote more effective and direct purification, if compared to purification via precipitation or extraction by solvents—which are commonly-used techniques. The RIL process of the invention used in nickel recovery due to acid leaching provide the following benefits:

a) Acid leaching can produce a hard-to-settle pulp or solids which, when separated, are difficult to wash. The RIL process solve these operating hurdles by eliminating the solid-liquid separation stage;

b) Reduced investment cost, due to use of ionic exchange resins in the same equipment circuit during leaching and adsorption;

c) Nickel loss is minimized through co-precipitation, since pulp neutralization can be eliminated or dampened. The resin added to the pulp has more adsorption kinetics, allowing nickel to be loaded as soon as it is leached, long before coprecipitation during the neutralization process;

d) Preferential and kinetic nickel adsorption is swifter than in other soluble metals, because nickel is immediately captured by the resin as soon as it is dissolved;

e) Greater nickel and cobalt extraction from ore during leaching. Hence, the process provides higher selectivity and higher loading capacity for nickel species in solution. If the dissolved ions are promptly removed from the solution by the ionic exchange mechanism, balance is displaced, as per Lê Chatelier's Law.

The use of ionic exchange resins to recover nickel from acid solutions has been the focus of much research in the last few years. Those skilled in the art believed that resins could not compete with other purification techniques, because resins then produced had low selectivity and—even more importantly—had low mechanical and thermal resistance. However, progress in the last few years has improved such properties considerably. It can be now stated that current resins are quite competitive, if compared to processes of precipitation, crystallization, extraction by solvents, used in impure nickel solutions. Nickel soluble ionic species are adsorbed into resins through an ionic exchange reaction. Resins are synthetic materials with an inert matrix (usually polystyrene cross-linked with divinylbenzene) and functional surface groups. There are basically two types of resins to adsorb nickel from acid solutions: resins with iminodiacetic acid as a functional group, and resins with bis-picolylamine as a functional group. The first resins have a weak acid group and can only exchange ions after pH adjustment. This makes its use difficult, given the need for previous neutralization. Hence, efforts are being made to incorporate resins with the bis-picolylamine group and make them commercially available in the market.

Ionic exchange resin is an innovative nickel-recovery technology, albeit its use in nickel recovery is still under development in the hydrometauurgy area. Its chief rationale for being still incipient is an abundance and efficiency of other purification techniques, such as precipitation and extraction via solvents. Polymeric resins are used to adsorb nickel and cobalt through ionic exchange. Resins are regarded as relatively expensive and their feasible use is limited to RIP (resin in pulp) and RIL techniques, wherein polymeric resins are directly applied to the pulp, with no need for solid-liquid separation. It is interesting to distinguish RIP from RIL. In RIL, the resin is added to the ore at the same time leaching agents are also added. In RIP, the resin is contacted to the leaching effluent and introduced into the circuit after the leaching stage. There are some similar principles but also fundamental differences between the two processes.

Nickel recovery processes from resin-based sulfur solutions are similar to each other and involve stages of charging (loading), elution and regeneration. Thus, resins can be used to treat clarified solutions (through RIS—resin in solution), for pulps (through RIP—resin in pulp) or resin in leach (RIL). From a practical standpoint, a major difference is mechanical resin resistance and its adequate grain size (granulometry). This implies differences in vat stirring systems and in pulp-adsorbent separation. A case in point is using air stirring systems (pachuca) for adsorption, rather than mechanically-stirred vats.

Leaching liberates metals from ore through chemical dissolution. It is the basis for most hydrometallurgical extraction processes. Leaching's chief objective is to selectively liberate a maximum amount of the metal of interest. Since acid leaching procedures for nickel are normally aggressive, impurities are also liberated along with the metals of interest in solution. Leaching is a well-established successful method of mineral extraction, especially for high-grade ores. In contrast, leaching low-grade ores is costly and economically unfeasible, given a high acid consumption yielding low concentration of metals of interest, if compared to the presence of impurities. This implies processing large volumes of diluted solutions in per-unit purification operations, in order to obtain a pure and concentrated solution of the metal of interest, conducive to its final recovery. In some cases, leaching and transfer of species of interest become very difficult, depending of the concentration of these metals in solution, as per Lê Chatelier's Law. In order to avoid this phenomenon, multi-stage leaching circuits are used, preferably operating in countercurrent flow with the presence of resins.

Nickel recovery can be done through resin in leach as proposed in the present invention. Metals such as copper, iron and aluminum easily dissolve in the acid solution. Under conditions necessary to nickel dissolution, acid will react with these metals and be consumed. Ionic exchange resins can be used to recover little-soluble ores or ores bearing solid particles hard to dissociate and form ion traces in solutions. Dissolution balance is established between ions dissolved in solution and solid particles. If the traces of dissolved ions are removed from the solution through ionic exchange, the balance is displaced and further dissolution soon occurs, as per Lê Chatelier's Law. It is essential for the economics of the process that the ionic exchange resin have high selectivity and high charging (loading) balance for the species of interest with low concentrations in the solution. Full dissolution of partially-soluble solids and total liberation of the species of interest are possible, if enough resin is present. Recovery of such species can also be improved, if the contaminant species are removed from the solution during leaching (via precipitation methods).

Nickel concentration in solution increases significantly during leaching. Regrettably, impurity concentration increases simultaneously and, according to Lê Chatelier's Law, excessive increase of species concentration in solution displaces the reaction balance, forming precipitated solids. In order to minimize this reprecipitation reaction, further leaching agent (acid) is necessary to resolubilize nickel, resulting in high acid consumption per mass unit of leached nickel increasing the process' operating cost. The existing balance between solid and dissolved ions is disturbed when the rich solution is removed from between the different leaching stages. Additional solid dissolution then occurs, according to Lê Chatelier's Law.

Given such constraint, it is of the utmost importance to develop a technology capable of providing a more selective extraction process for the species of interest and of minimizing the size of purification and refine units. Moreover, the species of interest must be concentrated in a stage conducive to their easy separation from the leached ore's pulp. Likewise, it is of the most importance to minimize reagent consumption, especially by ganga minerals present in the ore.

Ionic exchange is one of the more promising new technologies available to treat low grade ores. Even though the benefits of this technology in the extractive industry have long been recognized, its progress has been hampered by the unavailability of resins with controlled properties, such as capacity, selectivity and stability. Currently, it is possible to synthesize chemically and physically stable highly-selective resins. This allows ionic exchange resins to be used in hydrometallurgical processes, such as extraction of primary ores, metal recovery in recycled materials, and contaminant removal in effluent treatment.

In the present invention, effluent treatment and operating costs (minimum leaching consumption) is minimized since dissolution (leaching) occurs simultaneously with adsorption (liquid phase removal) of nickel species in a separate stage, with the use of ionic exchange resins. Species of metal of interest with little dissociation are recovered from low-solubility solids using ionic exchange resins in a pulp mix (known as resin-in-leach mix) simultaneously containing the ore and the resin. Traces of ions rendered soluble from the metal of interest are removed from the solution by the resin. This disturbs the balance in the solid/liquid dissociation. Additional solid dissolution thus becomes necessary (Lê Chatelier's Law) to restore the balance concentration of nickel species in solution, which are again removed by reacting in the exchange with the resin. Full solid dissolution and total liberation of the species of interest occurs through continuous displacement of the solid/liquid balance, resulting from the addition of excessive resin. Balance displacement is clearly the main mechanism to recover metal species from little-soluble solids in resin-in-leach mixtures.

Dissociation balance exists between ions dissolved in solution and solid ore particles. This balance is disturbed when metals in this solution, at different leaching stages, are removed. The solution is then restabilized through subsequent solid dissolution, as per Lê Chatelier's Law. Soluble species of interest can be recovered using ionic exchange resins in a pulp mix containing ore and resin (both solid) via RIL. The metal of interest is removed from the solution by the ionic exchange reaction, thus disturbing the solid/liquid dissociation balance. Subsequent solid dissolution occurs and restores the balance concentration of the metal in solution, which is removed again from the solution through ionic exchange reaction. Changing balance conditions is the chief mechanism to recover species in the RIL process.

In principle, ionic exchange is a process governed by electrostatic interactions among different species and occurring between the resin's interior and the external solution. In order to ensure electric neutrality in both phases, the ionic exchange reaction must transfer an equivalent amount of stoichiometric species similarly loaded (charged).

Literature describes different approaches for solving the problems the present invention aims to circumvent.

U.S. Pat. No. 3,998,924 "Recovery of Non-ferrous Metals from Acidic Liquors with a Chelate Exchange Resin in Presence of Iron (III)" to K. Jones, et al. discloses a RIP process comprising contacting (1) an acidic hydrometallurgical leach liquor containing ferric iron and non-ferrous transition metal values at a pH of about 1.0-5.0 with (2) a water-insoluble 2-picolylamine chelate resin in the presence of (3) at least about 0.3 mole per mole ferric iron of a water-soluble reducing agent to concurrently reduce the ferric iron and extract the non-ferrous transition metal values; and thereafter regenerating the loaded chelate resin to recover an enriched aqueous product containing at least 20 parts non-ferrous transition metal per part iron.

GB 2291870A "Recovering Nickel from a Nickel Sulphide Concentrate" to T. Tunley discloses a RIP process for producing ferronickel wherein a solution of nickel sulphate and iron sulphate is produced by leaching a nickel sulphide concentrate. The solution is subjected to an ion exchange step whereafter ferronickel is electronwon from an eluate solution of nickel. The essential steps of said process include: leaching the slurry concentrate containing nickel sulphide, treating the sulphate solution thus formed with solvent extraction or with nickel or ferrous iron selective ion exchange reagent, whereby the nickel is separated from iron as an eluate solution, which is then electrowon to produce ferronickel.

U.S. Pat. No. 5,785,736 "Gold Recovery from Refractory Carbonaceous Ores by Pressure Oxidation, Thiosulfate Leaching and Resin-in-Pulp Adsorption" to K. Thomas et al. discloses a RIP process for treatment of precious metal ores in which gold is leached from an oxidized ore slurry using a thiosulfate salt lixiviant and copper catalyst. Gold and copper are subsequently loaded onto an ion exchange resin. Copper is recovered from the resin by elution with a thiosulfate solution; gold is recovered from the resin by elution with a thiocyanate solution. Gold is recovered from the eluate by precipitation, electrowinning or cementation.

U.S. Pat. No. 6,350,420 "Resin-in-Pulp Method for Recovery of Nickel and Cobalt" to W. Duyvesteyn, et al. relates to the hydrometallurgical processing of nickeliferous or cobaltiferous ores and, in particular, to the direct recovery of nickel and cobalt from a laterite leach slurry by extraction with ion exchange resin, which is then physically separated from the leach slurry. Although said document briefly recites the previous use of resin-in-leach processes for other ores, the subject-matter and the corresponding disclosure are restricted to a RIP process, wherein a relatively coarse ion exchange resin is added to the leach slurry, which contains ore particles much smaller than the ion exchange resin beads. The desired metal(s) are extracted onto the resin and then the resin is separated from the depleted leach slurry by screening or other suitable techniques. Therefore, said document provides a RIP process for metal recovery from acid laterite leach slurry. Although such process also eliminates the costly CCD circuit and provides selective extraction of nickel and cobalt from laterite ores, as in the preset invention, it is not a RIL process and therefore does not provides RIL's advantages recited above.

The WO 07/087,698 "Hybrid Process Using Ion Exchange Resins in the Selective Recovery of Nickel and Cobalt from Leaching Effluents" (co-invented by the present inventor) discloses a process comprising the steps of processing (1) laterite ore (M), being later treated for leaching (2) (atmospheric or pressurized) and including the option of treating the solution from the solid-liquid separation in existing plants (2), said process being characterized by including a cationic or chelating resin hybrid circuit, the first step (3) of ion exchange with resins exhibiting specific selectivity conditions for the removal of iron, aluminum and copper and the increase of the pH, and the second step (4) of ion exchange with resins making it possible to remove nickel and cobalt.

Other documents describing the state of the art include:

1. The Use of Ion-Exchange Resins for the Recovery of Valuable Species from Slurries of Sparingly Soluble Solids—*Minerals Engineering*, Volume 10, Issue 9, September 1997, Pages 929-945, P. G. R. De Villiersa, J. S. J. Van Deventerb and L. Lorenzenb.

2. Modification and Preparation of Polymeric Adsorbents for Precious-Metal Extraction in Hydrometallurgical Processes—*Reactive and Functional Polymers*, Volume 36, Issue 2, March 1998, Pages 149-165, J. L. Cortina, E. Meinhardt, O. Roijals and V. Marti.

3. "Chlorine Leaching of Gold-Bearing Sulphide Concentrate and its Calcine—*Hydrometallurgy*, Volume 29, Issues 1-3, June 1992, Pages 205-215, Li Ximing, Ke Jiajun, Meng Xinhui and Li Bin.

4. "Treatment of Carbonaceous Refractory Gold Ores—*Minerals Engineering*, Volume 4, Issues 7-11, 1991, Pages 1043-1055, P. M. Afenya.

SUMMARY OF THE INVENTION

It is an objective of the invention to provide an alternative and improved process for recovering nickel and/or cobalt from ore leaching pulps.

It is another objective of the invention to provide a process in which pulp is simultaneously leached by adding an acid or base, in order to dissolve the metals of interest, with adsorption of metals rendered soluble in ionic exchange resin, through a resin-in-leach process.

It is another objective of the invention to provide a more selective extraction process for the species of interest, as well as to minimize the size of purification and refining units. Yet another objective of the invention is to provide a process whereby one can reduce soluble impurity species or the use of cementing/complexation techniques to avoid adsorption into the resin.

In an embodiment of the invention, said ion exchange resin is selected from the group comprising: picolylamine; bis(2 picolyl) amine; n-methyl-2 picolylamine; n (2 hydroxyethyl) 2 picolylamine; n (2 hydroxypropyl) 2 picolylamine; and combinations thereof.

These and other objectives of the invention will be appreciated and become more evident with the detailed description of the invention.

PREFERRED EMBODIMENT OF THE INVENTION

Figure 1:
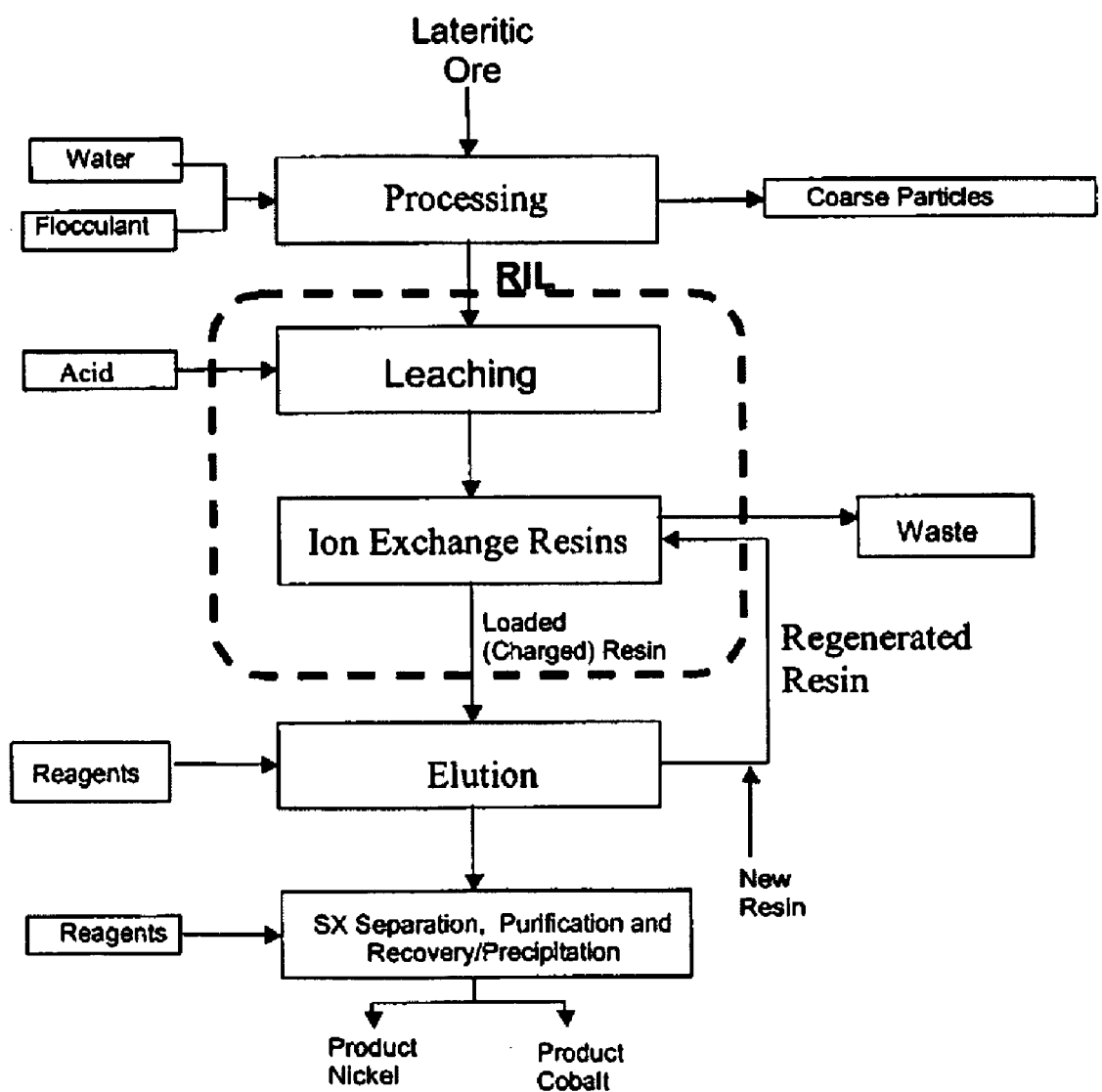
FIG. 1 shows a schematic representation of the invention.

The current invention is a process to directly recover nickel and cobalt from ores as well as pulp bearing such ores. Nickel-bearing ore can be oxide, lateritic or a mixture of both. Ore leaching or leaching the nickel-bearing concentrate can occur in various forms, but preferably under atmospheric conditions and in stirred vats. The ore is leached with any type of acid (sulfuric, chloridric, nitric) which renders metals soluble.

The process of the invention is a hydrometallurgical process applicable to a pulp resulting from lateritic ore, nickel oxidate, cobalt oxidate or a mixture containing nickel and cobalt as metals of interest, with other secondary metals. In the process of the invention (FIG. 1), pulp is simultaneously leached by adding an acid or base, in order to dissolve the metals of interest, with adsorption of metals rendered soluble in ionic exchange resin, through a process known as resin-in-leach (RIL). Preferably, the pH is adjusted by adding acid or base, such as hydroxides, oxides and/or carbonates, so as to best fit metal solubilization/precipitation performance, while providing optimal and selective loading (charging) of nickel and cobalt into the resin.

Commercial resins such as Dowex M4195®, Amberlite IRC748®, TP 207®, Ionac SR-5® and Purolite S930® can be regarded as representatives of the ionic exchange polymeric resins for hydro-metallurgical purposes indicated in treating acid aqueous solutions of nickel and cobalt sulfates. Chelating resins are examples of ionic exchangers that are quite effective in selectively removing heavy metals (such as nickel and cobalt), if compared to other exchangers. These exchangers are copolymers with covalent linked functional groups. They contain one or more donor atoms (Lewis base) which may form coordinated links to most metal ions (Lewis acid). Although coulombic and hydrophobic interactions are also present, their contribution in high metal ion selectivity is rather small, if compared to Lewis' acid-based interactions. These resins can be normally regenerated with acid solutions (sulfuric or chloridric acid) and high efficiency is secured. On the other hand, chelating exchangers such as the Dowex M4195® resin (bis-picolylamine functional group with nitrogen donor atoms) display some uncommon properties regarding metal ion recovery in aqueous condition Metal removing capacity remains nearly unchanged at low pH values—for instance, pH=1. Metal cations and anions can both be removed simultaneously from the solution. Finally, metal ion regeneration or desorption with ammonia is very efficient, while acid regeneration is less efficient. Characteristics such as those mentioned above indicate such resin for the purposes of the present invention.

Unless otherwise indicated, the adverb "about" before a series of values will apply to each value in the series.

The approach of the present invention has to do with using the resin-in-leach process in nickel and cobalt recovery, which is more efficient and economic than a conventional CCD circuit. Towards this end, some commercially-available resins must be able to extract nickel and cobalt with reasonable selectivity, to load (charge) and recover metal, so that the charged resin is not strongly dominated by another element. Adsorption and elution kinetics and selective charging features in some commercial chelating resins are governed by concentrations in the solution of metal of interest and their competitors. This type of resin tends to have better performance for transition metals vis-à-vis common organic exchangers. Likewise, since alkaline and alkaline-terrous metals do not form complexes stable with this type of resin, their use is not recommended for this objective. In a preferred embodiment of the invention, the resins to be used display type 2 functional group featuring picolylamine, bis(2 picolyl) Amine, n-methyl-2 picolylamine, n (2 hydroxyethy) 2 picolylamine, n (2 hydroxypropyl) 2 picolylamine.

The process of the invention also provides the reduction of soluble impurity species or use of cementing/complexation techniques to avoid adsorption into the resin. The sieving separates loaded (charged) resin from pulp. The secondary metals of the process of the invention are copper, iron, chrome, aluminum, magnesium, manganese, calcium. The preferred acid acting as leaching agent is selected from the group comprising sulfuric, chloride or nitric type.

The process of the invention is applicable for leaching of a concentrate bearing nickel and cobalt, lateritic ore, nickel oxide or cobalt oxide, under atmospheric pressure and temperature below 80° C., the main feature of the process consisting of using an ionic exchange polymeric resin, during the leaching stage, known as resin-in-leach.

The impurities such as trivalent iron and copper can be eliminated from solution through cementing/complexation techniques, with addition of iron, aluminum or metallic magnesium. Reducing agents (such as sulfides in general) can be added, in order to reduce impurities, such as trivalent iron to bivalent, thus avoiding its adsorption. The impurities such as copper can be precipitated by adding sulfides such as $H_2S$, NaHS, $Na_2S$. In a preferred embodiment of the invention, hexavalent chromium is eliminated from solution through addition of a reducing agent, thus precluding resin oxidation.

In the combined leaching/adsorption step of the process of the invention, the pulp contacts the ionic exchange resin under atmospheric conditions. This process is known as resin in leach. Once they are rendered soluble, nickel and cobalt are swiftly and selectively adsorbed by the resin. Chelating resins, preferably containing 2-picolylamine groups, can be used to meet the process' objectives. Dow Chemical's resin M4195, which contains the bis(2 pyicolyl) amine group, is suggested. Other chelating resins from Rohm & Haas and Lanxess can also be used. This group displays high selectivity for nickel and cobalt, if compared to other metals such as manganese, magnesium, aluminum and calcium.

During leaching, pH can be adjusted with the aid of an acid or base, so as to best fit the solubilization/precipitation performance of metals, at the same time ensuring optimal and selective loading of nickel and cobalt into the resin. Usually, pH in the RIL process must be maintained at about 0 to 5 and preferably at about 1 to 3. During the resin-in-leach process, the redox potential is adjusted by adding a reducing agent (metallic iron or sulfides in general) in order to reduce trivalent iron in its divalent form, thus precluding it from being adsorbed by the resin. A complexing agent may also be added, in order to prevent the iron from being adsorbed into the resin.

If there is any copper or iron in the solution, they too will be adsorbed by the resin. If this is undesirable, the metals must be removed from the solution as soon as they are rendered soluble, but prior to being adsorbed by the resin. One solution is the use of methods like cementing with metals such as iron, aluminum, magnesium. However, if these metals are adsorbed into the resin, they can be later removed through selective elution.

Hexavalent chromium is able to irreversibly oxidize the ionic exchange resin. This limits its use in many cycles. In such a case, it must be reduced as soon as it is rendered soluble, in order to avoid its contact with the resin.

Leaching occurs in a system of stirred vats, on a continuous or batch basis. In a continuous mode, the stirred vat system comprises four to twelve stages rearranged in tandem. The stirred vats can be mechanically agitated or undergo air agitation (pachuca type), with a cone-shaped bottom and a solid/liquid mix vase, into which air is injected from the cone-shaped bottom. Lesser physical degradation of the resin and better dispersion of the resin particles in the pulp, if compared to mechanical stirring, are advantages of the Pachuca system. The pulp flows and cascades down, from vat to vat, by gravity. Leaching occurs through the addition of a leaching agent, either acid (sulfuric, chloride) or basic (ammonia). Pulp flowing through the leaching vats contains between 25% and 45% solids, preferably 35%. RIL must occur at an adequate temperature, coherent with the resin's thermal stability limit (about 80° C.). The reaction rate usually increases with the temperature. Leaching temperature is between about 25° C. and 80° C., preferably between about 45° C. and 70° C., so as to trigger swift nickel dissolution, as soluble nickel sulfate. Higher temperatures accelerate leaching. Temperature must be kept below 80° C., to avoid reagents' degradation and especially resin degradation. Pulp residence time may be up to twelve hours (30 to 60 minutes per stage) and it is influenced by the size of the feeding material particles. To a lesser extent, other leaching conditions (pH, temperature, reagent concentration etc.) can also affect residence time. Resin volume in each stage is roughly 10% to 30% of pulp volume in the vat. The resin advances in countercurrent flow from stage to stage, through pumping or pneumatically hauling both pulp and resin to the next adsorption stage. The loaded (charged) resin exits the first adsorption stage and is pumped to a horizontal static or vibrating sieve, for separation and washing of resin and pulp. The resin preferably comprises the bis-picolylamine functional group.

Once metals are loaded (charged) into the resin, this resin is physically separated from the pulp in sieves, which sort out larger-diameter resins from fine-particulate pulp. Exiting the first adsorption stage, the resin goes through a separation sieve and is then washed. Now washed, humid and drained, the resin goes to the elution circuit, for nickel and cobalt desorption. Elution can be initially carried out with pH 2 acidified water, to remove iron adsorbed into the resin. Ammonium salt (ammonia sulfate or hydroxide) is then used, for copper removal. Lastly, acid is used (0.5-4M concentration, preferably 1M) for nickel and cobalt elution. If necessary and following elution, the resin may be regenerated and ions such as Na+, Ca 2+ may be included as mobile ions.

In a preferred embodiment of the invention, the metal elution can occur selectively and in stages. Preferably, the elution is conducted with about pH 2 acidified water for removal of iron adsorbed into the resin.

In a preferred embodiment of the invention, sulfuric, chloridric and/or nitric acid are used for nickel and cobalt elution, the preferred concentration being 0.5 to 4M, more preferably 1M. When necessary and following elution, resin can be regenerated and ions such as Na+, Ca 2+ can be included as mobile ions.

In a preferred embodiment of the invention, the ammonium salt (ammonia sulfate or hydroxide) is next used for copper removal.

Following elution, purification of nickel and cobalt present in the eluate can be recovered by conventional methods, such as precipitation, extraction by solvents and membranes. The regenerated resin goes back to the circuit, for further use.

Those skilled in the art will readily appreciate the teachings herein disclosed. The selected embodiments herein presented are not to be deemed as limiting the spirit of the invention and/or the scope of the appended claims.

What is claimed is:

1. A hydrometallurgical process for recovering Nickel and/or Cobalt in ore leaching pulps comprising:
    a) a combined leaching and adsorption step, wherein an aqueous pulp comprising laterite, Nickeliferous oxide, or Cobaltiferous oxide ore, or a combination thereof containing a first metal selected from the group consisting of Nickel, Cobalt, and combinations thereof together with a second metal different from the first metal, and water, is concurrently leached and adsorbed, said leaching occurring by adding a mineral acid to dissolve the contained metals, and said adsorption immediately occurring by the presence of an ion exchange resin admixed with the pulp; and
    b) at least one further step for metal elution under acidic conditions.

2. The hydrometallurgical process according to claim 1 comprising pH adjustment in at least one of step (a) or step (b) so as to best fit metal solubilization/precipitation performance while providing optimal and selective loading of Nickel and Cobalt into the resin.

3. The hydrometallurqical process accordingly to claim 1 comprising adjusting the pH of the process between about 0 and 5.

4. The hydrometallurgical process according to claim 3 comprising adjusting the pH of the process between about 1 and 3.

5. The hydrometallurgical process according to claim 1 wherein the leaching agent is selected from at least one of the group consisting of sulfuric acid, chloridric acid and nitric acid.

6. The hydrometallurgical process according to claim 1 comprising operating the process at atmospheric pressure and at a temperature below about 80.degree. C.

7. The hydrometallurgical process according to claim 1 comprising adding from at least one of the group consisting of iron, aluminum and metallic magnesium to the combined leaching and adsorption step, thereby eliminating impurities such as trivalent iron and copper.

8. The hydrometallurgical process according to claim 1 comprising adding a reducing agent to the combined leaching and adsorption step, thereby reducing and avoiding absorption of impurities.

9. The hydrometallurgical process according to claim 1 comprising adding at least one sulfide selected from at least one of the group consisting of $H_2S$, NaHS and $Na_2S$, thereby precipitating impurities.

10. The hydrometallurgical process according to claim 1 wherein said ion exchange resin is selected from the at least one of group consisting of picolylamine; bis(2picolyl) amine, n-methyl-2 picolylamine, n (2 hydroxyethyl) 2 picolylamine and n (2 hydroxypropyl) 2 picolylamine.

11. The hydrometallurgical process according to claim 1 wherein said metal elution occurs selectively and in multiple stages.

12. The hydrometallurgical process according to claim 1 wherein the elution of iron from the resin is performed by the addition of acidified water having a pH of about 2.

13. The hydrometallurgical process according to claim 1 wherein the elution of copper from the resin is performed by the addition of ammonium salt selected from the group consisting of ammonia sulfate and ammonia hydroxide.

14. The hydrometallurgical process according to claim 1 wherein the elution of at least one of Nickel or Cobalt is carried out in the presence of an acid selected from at least one of the group consisting of sulfuric acid, chloridric acid and nitric acid.

15. The hydrometallurgical process according to claim 14 wherein said acid is at a concentration of about 0.5 to 4M.

16. The hydrometallurgical process according to claim 1 wherein the resin is regenerated after elution.

17. The hydrometallurgical process according to claim 16 wherein Na+ and Ca 2+ ions are further included as mobile ions.

* * * * *